United States Patent
Hachet et al.

(10) Patent No.: US 11,708,920 B2
(45) Date of Patent: Jul. 25, 2023

(54) ANNULATED TUBULAR STRUCTURE INTENDED FOR TRANSPORTING FUEL INTO THE TANK

(71) Applicant: Arkema France, Colombes (FR)

(72) Inventors: Emilie Hachet, le Boscroger en Roumois (FR); Thibaut Montanari, Serquigny (FR); Nicolas Dufaure, Serquigny (FR)

(73) Assignee: ARKEMA FRANCE, Colombes (FR)

( * ) Notice: Subject to any disclaimer, the term of this patent is extended or adjusted under 35 U.S.C. 154(b) by 97 days.

(21) Appl. No.: 16/967,481

(22) PCT Filed: Feb. 19, 2019

(86) PCT No.: PCT/FR2019/050365
§ 371 (c)(1),
(2) Date: Aug. 5, 2020

(87) PCT Pub. No.: WO2019/162604
PCT Pub. Date: Aug. 29, 2019

(65) Prior Publication Data
US 2021/0215278 A1    Jul. 15, 2021

(30) Foreign Application Priority Data
Feb. 21, 2018 (FR) ...................... 18.51461

(51) Int. Cl.
| F16L 11/15 | (2006.01) |
| B32B 1/08 | (2006.01) |
| B32B 27/08 | (2006.01) |
| B32B 27/20 | (2006.01) |
| B32B 27/22 | (2006.01) |
| B32B 27/32 | (2006.01) |
| B32B 27/34 | (2006.01) |
| B60K 15/03 | (2006.01) |
| B67D 7/04 | (2010.01) |
| B67D 7/38 | (2010.01) |
| C08L 77/02 | (2006.01) |
| C08L 77/06 | (2006.01) |

(52) U.S. Cl.
CPC ............. *F16L 11/15* (2013.01); *B32B 1/08* (2013.01); *B32B 27/08* (2013.01); *B32B 27/20* (2013.01); *B32B 27/22* (2013.01); *B32B 27/322* (2013.01); *B32B 27/34* (2013.01); *B60K 15/03177* (2013.01); *B67D 7/04* (2013.01); *B67D 7/38* (2013.01); *C08L 77/02* (2013.01); *C08L 77/06* (2013.01); *B32B 2597/00* (2013.01)

(58) Field of Classification Search
CPC . F16L 11/15; B32B 1/08; B32B 27/08; B32B 27/20; B32B 27/22; B32B 27/322; B32B 27/34; B32B 2597/00; B60K 15/03177; B67D 7/04; B67D 7/38; C08L 77/02; C08L 77/06
See application file for complete search history.

(56) References Cited

U.S. PATENT DOCUMENTS

| 5,076,329 A | 12/1991 | Brunnhofer |
| 5,284,184 A | 2/1994 | Noone et al. |
| 5,383,083 A | 1/1995 | Shinoda et al. |
| 5,460,771 A | 10/1995 | Mitchell et al. |
| 5,469,892 A | 11/1995 | Noone et al. |
| 5,865,218 A | 2/1999 | Noone et al. |
| 6,321,794 B1 | 11/2001 | Ishida et al. |
| 2007/0075543 A1 | 4/2007 | Marx et al. |
| 2011/0277867 A1 | 11/2011 | Katayama et al. |
| 2016/0193813 A1* | 7/2016 | Sato ........................ F16L 11/04 428/474.9 |
| 2017/0261133 A1* | 9/2017 | Nakamura ............... F16L 11/04 |

FOREIGN PATENT DOCUMENTS

| CN | 102317062 A | 1/2012 |
| WO | WO 2007/029424 A1 | 3/2007 |

OTHER PUBLICATIONS

Office Action (the First Office Action) dated Oct. 24, 2022, by the State Intellectual Property Office of People's Republic of China in corresponding Chinese Patent Application No. 201980014425.9, and an English Translation of the Office Action. (16 pages).

* cited by examiner

*Primary Examiner* — Michael C Miggins
(74) *Attorney, Agent, or Firm* — Buchanan Ingersoll & Rooney P.C.

(57) ABSTRACT

A partially annulated flexible tubular structure located at least partially inside the fuel tank, in particular the gasoline or diesel tank, particularly the gasoline tank, of a vehicle, said structure being capable of being at least partially submerged in said tank and being intended for transporting said fuel into said tank, said tubular structure comprising at least one layer (1) comprising a composition comprising: a. between 39% and 100% by weight, in particular between 41% and 100% by weight, of at least one aliphatic polyamide of formula W/Z, b. between 0% and 4% by weight, and preferably between 0 and 2%, of at least one plasticizer, c. between 0% and 20% of at least one impact modifier, d. between 0% and 37% by weight of at least one additive, the sum of a.+b.+c.+d. being equal to 100% of the total weight of the composition, excluding a fuel transport structure running from the tank to the motor of the vehicle.

27 Claims, No Drawings

ANNULATED TUBULAR STRUCTURE INTENDED FOR TRANSPORTING FUEL INTO THE TANK

This application claims benefit, under U.S.C. § 119 or § 365 of PCT Application Number PCT/FR2019/050365, filed Feb. 19, 2019, and French Patent Application Number FR18.51461 filed Feb. 21, 2018, these documents being incorporated herein by reference.

The invention relates to a partially annulated flexible tubular structure for transporting a fuel, in particular gasoline or diesel, particularly gasoline, into the tank of a motor vehicle.

More particularly, the invention relates to a monolayer or multilayer tubular structure being at least partially located inside the fuel tank and being capable of being at least partially submerged in the vehicle tank.

Said monolayer or multilayer tubular structure is therefore intended to be at least partially inside the fuel tank and is capable of being at least partially submerged in the tank of the vehicle.

Fuels currently used in motor vehicles increasingly include corrosive compounds such as methanol or ethanol.

Alcoholic compounds as well as other compounds present in the fuels transported cause the dissolution and diffusion of chemicals, particularly monomers and oligomers derived from the tube in contact with gasoline, the tube typically consisting of aliphatic materials such as aliphatic polyamides such as PA 11 or PA 12.

Vehicle manufacturers are becoming increasingly demanding about the amount of extractables such as monomers/oligomers dissolved in gasoline, which are more likely to clog injectors.

In accordance with U.S. Pat. No. 5,076,329, a layer of PA 6 as an inner layer makes it possible to at least partially eliminate the problem of excess of extractables, which would occur with PA 12 in the inner layer of a gasoline transport tube comprising five layers. The use of a five-layer system makes it possible to obtain a tube with PA 12 impact resistance with a low level of monomers/oligomers.

Nevertheless, in accordance with document WO 94/09303, these characteristics cannot be obtained with a tube comprising less than five layers.

This document then recommends the use of a partially annulated two-layer or three-layer tube comprising, for the two-layer structure, an outer layer, which may be made of PA 11 or PA 12, and an inner layer, which is not made of polyamide and is selected from fluorinated compounds such as PVDF. In the context of the three-layer structure, a bonding layer, particularly made of PVDF, is then introduced between the outer layer and the inner layer.

However, these tubes have an operating temperature between −40° C. and 150° C., and are used for vehicle motors.

EP 1039199 discloses partially annulated tubes for use in transporting gasoline comprising at least two layers, an outer layer of polyamide and an inner layer of tetrafluoroethylene-hexafluoropropylene-vinylidene fluoride (THV).

Nevertheless, this document specifies that the outer layer protects the tube, for example, from the impact caused by a stone when the car is running and that it is preferable for the resin to have a certain level of resistance to elongation and impact, which implies that the use of this tube is intended for transporting gasoline from the tank or into the motor.

For use of the tube in the tank of the vehicle, it is therefore necessary to have a tube available, which, although capable of being at least partially submerged in the fuel of the vehicle, has an amount of extractables, which is less than that of the tubes of the background art hereinbefore and meets the requirements of the manufacturers.

This has been solved by the partially annulated flexible structure of the invention.

The present invention therefore relates to a partially annulated flexible tubular structure located at least partially inside the fuel tank, in particular the gasoline or diesel tank, particularly the gasoline tank, of a vehicle, said structure being capable of being at least partially submerged in said tank and being intended for transporting said fuel into said tank, said tubular structure comprising at least one layer (1) comprising a composition comprising:

a. between 39% and 100% by weight, in particular between 41% and 100% by weight, of at least one aliphatic polyamide of formula W/Z wherein:

W is an aliphatic repeating unit obtained from the polycondensation of at least one $C_6$-$C_{18}$ lactam, preferably $C_7$-$C_{13}$ lactam, or at least one $C_6$-$C_{18}$ aminocarboxylic acid, preferably $C_7$-$C_{13}$ aminocarboxylic acid, or is an aliphatic repeating unit XY having an average number of carbon atoms per denoted nitrogen atom ranging from 6 to 18, preferably from 7 to 13, obtained from the polycondensation:

at least one $C_6$-$C_{18}$ diamine X, said diamine being selected from a linear or branched aliphatic diamine or a mixture thereof, and at least one $C_6$-$C_{18}$ aliphatic dicarboxylic acid Y, Z is at least one optional polyamide repeating unit, Z being able to be present at up to 30% by weight relative to the total weight W/Z, preferably up to 15% by weight relative to the total weight W/Z, b. between 0% and 4% by weight, preferably between 0 and 2%, of at least one plasticizer, c. between 0% and 20% of at least one impact modifier, d. between 0% and 37% by weight of at least one additive, the sum of a.+b.+c.+d. being equal to 100%, excluding a fuel transport structure running from the tank to the motor of the vehicle.

In other words, said structure is intended to be placed at least partially inside the fuel tank.

The inventors have therefore found that a tubular structure comprising a layer comprising a particular composition as defined hereinbefore made it possible to greatly reduce the amount of extractables and particularly the "solubles" and thus meet the requirements of an extractable test by a motor vehicle manufacturer.

The term "flexible" means that the deformation and extension ability of the tubular structure make it possible to form relatively small angles making it possible to adapt the tubular structure to a limited space delimited by the fuel tank.

The expression "being located at least partially inside the tank" means that preferably more than 70%, more preferably more than 90%, even more preferably more than 95%, and particularly 100% of the total length of the tube is located in the tank, part of the said tube being able to leave the said tank in order to adapt to a tube for transporting gasoline between the tank and the motor, particularly by means of a connector.

In one embodiment, said tubular structure comprises at least one layer (1) comprising a composition consisting of:

a. between 39% and 100% by weight, in particular between 41% and 100% by weight, of at least one aliphatic polyamide of formula W/Z wherein:

W is an aliphatic repeating unit obtained from the polycondensation of at least one $C_6$-$C_{18}$ lactam, preferably $C_7$-$C_{13}$ lactam, or at least one $C_6$-$C_{18}$ aminocarboxylic acid, preferably $C_7$-$C_{13}$ aminocarboxylic acid, or is an aliphatic repeating unit XY having an average number of carbon atoms per denoted nitrogen atom ranging from 6 to 18, preferably from 7 to 13, obtained from the polycondensation:

at least one $C_6$-$C_{18}$ diamine X, said diamine being selected from a linear or branched aliphatic diamine or a mixture thereof, and at least one $C_6$-$C_{18}$ aliphatic dicarboxylic acid Y, Z is at least one optional polyamide repeating unit, Z being able to be present at up to 30% by weight relative to the total weight W/Z, preferably up to 15% by weight relative to the total weight W/Z, b. between 0% and 4% by weight, preferably between 0 and 2%, of at least one plasticizer, c. between 0% and 20% by weight of at least one impact modifier, d. between 0% and 37% by weight of at least one additive, the sum of a.+b.+c.+d. being equal to 100% of the total weight of the composition, excluding a fuel transport structure running from the tank to the motor of the vehicle.

There are therefore no constituents in said composition other than constituents a, b, c, and d, the sum of which is equal to 100% by weight.

In another embodiment, said tubular structure comprises at least one layer (1) consisting of a composition consisting of:

a. between 39% and 100% by weight, in particular between 41% and 100% by weight, of at least one aliphatic polyamide of formula W/Z wherein:

W is an aliphatic repeating unit obtained from the polycondensation of at least one $C_6$-$C_{18}$ lactam, preferably $C_7$-$C_{13}$ lactam, or at least one $C_6$-$C_{18}$ aminocarboxylic acid, preferably $C_7$-$C_{13}$ aminocarboxylic acid, or is an aliphatic repeating unit XY having an average number of carbon atoms per denoted nitrogen atom ranging from 6 to 18, preferably from 7 to 13, obtained from the polycondensation:

at least one $C_6$-$C_{18}$ diamine X, said diamine being selected from a linear or branched aliphatic diamine or a mixture thereof, and at least one $C_6$-$C_{18}$ aliphatic dicarboxylic acid Y, Z is at least one optional polyamide repeating unit, Z being able to be present at up to 30% by weight relative to the total weight W/Z, preferably up to 15% by weight relative to the total weight W/Z, b. between 0% and 4% by weight, preferably between 0 and 2%, of at least one plasticizer, c. between 0% and 20% by weight of at least one impact modifier, d. between 0% and 37% by weight of at least one additive, the sum of a.+b.+c.+d. being equal to 100% of the total weight of the composition, excluding a fuel transport structure running from the tank to the motor of the vehicle.

The layer (I) in this embodiment therefore consists only of the said composition, which itself consists only of the constituents a, b, c, and d, the sum of which is equal to 100% by weight.

Advantageously, between 90% and 98% of the total length of the tube is located in the tank.

Advantageously, between 95% and 98% of the total length of the tube is located in the tank.

More particularly, more than 98% of the total length of the tube is located in the tank.

The expression "partially annulated" means that the tube has a corrugated tubular shape over part of its length. The annulated part may form a single portion or more portions of the structure, in which case two annulated portions are separated by a smooth portion.

The annulated part(s) allow increasing the deformation and extension of the tubular structure, particularly in areas of the tank where small angles are required.

Advantageously, the tubular structure is annulated over at least 10% of its length.

Advantageously, the tubular structure is annulated over a proportion of between 10 and more than 90% of its length.

Advantageously, the tubular structure is annulated over a proportion of 20 to 90% of its length.

Advantageously, the tubular structure is annulated over a proportion of 30 to more than 90% of its length.

Advantageously, the tubular structure is annulated over a proportion of 40 to more than 90% of its length.

Advantageously, the tubular structure is annulated over a proportion of 50 to more than 90% of its length.

Advantageously, the tubular structure is annulated over a proportion of 60 to more than 90% of its length.

Advantageously, the tubular structure is annulated over a proportion of 70 to more than 90% of its length.

Advantageously, the tubular structure is annulated over a proportion of 80 to more than 90% of its length.

Advantageously, the tubular structure is annulated over a proportion of more than 90% of its length.

The expression "being capable of being at least partially submerged in said tank" means that said structure is either not submerged, regardless of the fill level of the tank, or that at least 30% of the length of said structure is submerged in the fuel.

It is quite obvious that this proportion depends upon the fuel fill level in the tank and that the values thus given correspond to a tank comprising the maximum amount of fuel that it can contain.

Advantageously, at least 40% of the length of said structure is submerged in the fuel.

Advantageously, at least 50% of the length of said structure is submerged in the fuel.

Advantageously, at least 60% of the length of said structure is submerged in the fuel.

Advantageously, at least 70% of the length of said structure is submerged in the fuel.

Advantageously, at least 80% of the length of said structure is submerged in the fuel.

In another embodiment, the structure is at least partially within the tank, but is not submerged regardless of the fill level of the tank.

The tubular structure of the invention is intended for transporting fuel into the tank and therefore does not relate to a tubular structure for transporting fuel from the tank to the motor or in the motor of the vehicle, even if it is quite obvious that the structure of the invention has a small part which is located outside the tank.

Nevertheless, this part will be fixed to a connector making it possible to connect the tubular structure of the invention to the tubular structure for transporting fuel from the tank to the motor and therefore cannot be considered as this latter structure for transporting fuel from the tank to the motor.

It is quite obvious that when a plasticizer and/or an impact modifier and/or an additive is/are present, a skilled person will vary the proportions of aliphatic polyamide so that the sum a.+b.+c.+d is equal to 100%.

Regarding Layer (1)

Layer (1) comprises between 39% and 100% by weight, in particular between 41% and 100% by weight, of at least one aliphatic polyamide of formula W/Z.

According to the present application, the term "polyamide," also denoted PA, covers:
- homopolymers (or homopolyamides),
- copolymers, or copolyamides, based on different amide units,
- polyamide alloys, provided that polyamide is the major constituent.

There is also a category of copolyamides in the broad sense, which, although not preferred, forms part of the scope of the invention. These are copolyamides comprising not only amide units (which will be in the majority, and so they are to be considered as copolyamides in the broad sense), but also units of non-amide nature, for example ether units. The best known examples are PEBA or polyether-block-amide, and their copolyamide-ester-ether, copolyamide-ether or copolyamide-ester variants. Among these, mention may be made of PEBA-12 where the polyamide units are the same as those of PA12, PEBA-612 where the polyamide units are the same as those of PA612.

The nomenclature used to define the polyamides is described in ISO standard 1874-1:1992 "Plastiques—Matériaux polyamides (PA) pour moulage and extrusion—Partie 1: Désignation", in particular on page 3 (Tables 1 and 2) and is well known to the person skilled in the art.

In one embodiment, the tubular structure of the invention consists of at least one layer (1).

The tubular structure can comprise a plurality of identical or different layers (1), in particular identical.

In another embodiment, the tubular structure of the invention consists of a single layer (1) but may comprise other layers.

In yet another embodiment, the structure is monolayer and consists of a single layer (1).

In the case where the tubular structure is a monolayer structure, said structure is therefore in contact with the gasoline both by its external surface and by its internal surface.

Regarding the W/Z Repeating Unit

W: Aliphatic Repeating Unit Obtained from the Polycondensation of at Least One Aminocarboxylic Acid or at Least One Lactam In a first variant of the invention, the repeating aliphatic unit W is obtained from the polycondensation of at least one $C_6$-$C_{18}$ aminocarboxylic acid, preferably $C_7$-$C_{13}$ aminocarboxylic acid.

Advantageously, said aminocarboxylic acid comprises from 9 to 12 carbon atoms. It can accordingly be chosen from 9-aminononanoic acid (denoted 9), 10-aminodecanoic acid (denoted 10), 11-aminoundecanoic acid (denoted 11) and 12-aminododecanoic acid (denoted 12); advantageously the aminocarboxylic acid is 11-aminoundecanoic acid.

In a second variant of the invention, the repeating aliphatic unit W is obtained from the polycondensation of at least one $C_6$-$C_{18}$ lactam, preferably $C_7$-$C_{13}$ lactam.

Advantageously, the lactam comprises from 9 to 12 carbon atoms. It can accordingly be chosen from decanolactam (denoted 10), undecanolactam (denoted 11) and laurolactam or lauryllactam (denoted 12); advantageously, the lactam is lauryllactam.

However, it can absolutely be envisaged to use, for the production of this same unit W, a mixture of two or more aminocarboxylic acids, a mixture of two or more lactams, but also a mixture of one, two or more aminocarboxylic acids with one, two or more lactams.

In a more particularly preferred manner, the repeating unit W is obtained from a single aminocarboxylic acid or from a single lactam.

In one embodiment, a repeating unit containing at least 20% repeating units obtained from the polycondensation of units derived from an aminocarboxylic acid or a $C_{12}$ lactam as a raw material is excluded from the definition of W.

In another embodiment, a repeating unit containing at least 20% of repeating units obtained from the polycondensation of units derived from an aminocarboxylic acid or from a $C_{12}$ lactam as raw material is excluded from the flexible tubular structure of the invention regardless of the number of layers of said structure.

In another embodiment, a repeating unit obtained from the polycondensation of a $C_{12}$ lactam or aminocarboxylic acid is excluded from the definition of W.

In yet another embodiment, a repeating unit obtained from the polycondensation of a $C_{12}$ lactam or aminocarboxylic acid as raw material is excluded from the flexible tubular structure of the invention regardless of the number of layers of said structure.

W: Aliphatic Repeating Unit X.Y

The aliphatic repeating unit X.Y is a unit obtained from the polycondensation of at least one linear or branched $C_6$-$C_{18}$, preferably $C_7$-$C_{13}$, aliphatic diamine X or a mixture thereof, and at least one $C_6$-$C_{18}$, preferably $C_7$-$C_{13}$, aliphatic dicarboxylic acid Y.

The molar proportions of diamine and dicarboxylic acid are preferably stoichiometric.

The aliphatic diamine used to obtain this repeating unit X.Y is an aliphatic diamine that has a linear main chain comprising from 6 to 18 carbon atoms.

This linear main chain can, if necessary, include one or more methyl and/or ethyl substituent(s); in the latter configuration, this is called a "branched aliphatic diamine". In the case where the main chain does not include any substituent, the aliphatic diamine is called a "linear aliphatic diamine."

Whether or not it includes methyl and/or ethyl substituents on the main chain, the aliphatic diamine used to obtain this repeating unit X.Y comprises from 6 to 18 carbon atoms, particularly from 7 to 13 carbon atoms.

When this diamine is a linear aliphatic diamine, it particularly corresponds to the formula H2N—(CH2)x-NH2 and can be selected for example from hexanediamine, heptanediamine, octanediamine, nonanediamine, decanediamine, undecanediamine, dodecanediamine, tridecanediamine, tetradecanediamine, hexadecanediamine and octadecanediamine. The linear aliphatic diamines that have just been cited can all be bio-sourced in the sense of standard ASTM D6866.

When this diamine is a branched aliphatic diamine, it can in particular be 2-methyl-pentanediamine, 2-methyl-1,8-octanediamine or trimethylene (2,2,4 or 2,4,4) hexanediamine.

The dicarboxylic acid comprises between 6 to 18 carbon atoms, particularly between 7 to 13 carbon atoms.

The aliphatic dicarboxylic acid can be selected from the linear or branched aliphatic dicarboxylic acids When the dicarboxylic acid is aliphatic and linear, it can be selected from adipic acid (6), heptanedioic acid (7), octanedioic acid (8), azelaic acid (9), sebacic acid (10), undecanedioic acid (11), dodecanedioic acid (12), brassylic acid (13), tetradecanedioic acid (14), hexadecanedioic acid (16), octadecanedioic acid (18), octadecanedioic acid (18).

Advantageously, said layer (1) comprises a composition comprising at least 49% by weight of said at least one aliphatic polyamide.

Advantageously, said layer (1) comprises a composition comprising at least 50% by weight of said at least one aliphatic polyamide.

Advantageously, said layer (1) comprises a composition comprising at least 60% by weight of said at least one aliphatic polyamide.

Advantageously, said layer (1) comprises a composition comprising at least 70% by weight of said at least one aliphatic polyamide.

Advantageously, said layer (1) comprises a composition comprising at least 80% by weight of said at least one aliphatic polyamide.

Z: Optional Repeating Unit

Z may be any polyamide repeating unit, whether aliphatic, cycloaliphatic, semi-aromatic or aromatic.

Z may be present at up to 30% by weight relative to the total weight W/Z.

Advantageously, Z is present at up to 25% by weight.
Advantageously, Z is present at up to 20% by weight.
Advantageously, Z is present at up to 15% by weight.
Advantageously, Z is present at up to 10% by weight.
Advantageously, Z is present at up to 5% by weight.
Advantageously, Z is equal to 0% by weight.

Regarding the Plasticizer:

The plasticizer is selected particularly from benzene sulfonamide derivatives, such as n-butyl benzene sulfonamide (BBSA); ethyl toluene sulfonamide or N-cyclohexyl toluene sulfonamide; esters of hydroxy-benzoic acids, such as ethyl-2-hexyl parahydroxybenzoate and decyl-2-hexyl parahydroxybenzoate; esters or ethers of tetrahydrofurfuryl alcohol, such as oligoethyleneoxytetrahydrofurfuryl alcohol; and esters of citric acid or of hydroxy-malonic acid, such as oligoethyleneoxy malonate.

Using a mixture of plasticizers would not be outside the scope of the invention.

The particularly preferred plasticizer is n-butyl benzene sulfonamide (BBSA).

The plasticizer may be introduced into the polyamide during polycondensation or later.

The plasticizer used in the composition is in a proportion by mass of 0 to 4%, particularly from 0 to 2%.

Above 4%, the proportion of plasticizer is too high and the proportion of extractables is then too high.

In one embodiment, beyond 2%, the proportion of plasticizer is too high and the proportion of extractables is then too high.

In yet another embodiment, the plasticizer used in the composition is in a proportion by mass of 0.1 to 2%.

Since the tube is partially annulated, this geometry of the tubular structure provides a certain flexibility and said composition of said layer (1) therefore does not necessarily require the presence of a plasticizer.

In an advantageous embodiment, said composition of said layer (1) is devoid of plasticizer.

Advantageously, the tubular structure is annulated over a proportion of between 10 to more than 90% of its length and said composition of layer (1) is devoid of plasticizer.

Regarding the Impact Modifier

The tubular structure of the invention is located in the tank and, as a result, the latter is protected from impacts and does not require any particular protection against impacts and therefore the impact modifier may be omitted.

Nevertheless, in order to gain flexibility, the presence of impact modifier may be useful and/or desirable.

The expression "impact modifier" means a polyolefin based polymer having a flexural modulus less than 100 MPa measured according to the standard ISO 178:2010 (23° C. RH50) and Tg below 0° C. (measured according to the standard 11357-2:2013 at the level of the inflection point of the DSC thermogram), in particular a polyolefin.

The impact modifier may also be a PEBA (polyether-block-amide) block polymer having a flexural modulus <200 MPa.

The polyolefin of the impact modifier can be functionalized or non-functionalized or be a mixture of at least one functionalized polyolefin and/or least one non-functionalized polyolefin.

In particular, a part or all of the polyolefins relates to a function chosen from the carboxylic acid functions, carboxylic anhydride and epoxide, and is particularly chosen from a copolymer of ethylene and propylene with an elastomer character (EPR), an ethylene-propylene-diene copolymer with elastomer character (EPDM) and an ethylene/alkyl (meth)acrylate copolymer, a higher ethylene-alkene copolymer, particularly an ethylene-octene copolymer, an ethylene-alkyl acrylate-maleic anhydride terpolymer.

Advantageously, the impact modifier is selected from Fusabond® N493, Fusabond MF416D, a Lotader®, in particular Lotader® 4700, Lotader® 5500, Lotader® 7500 or Lotader® 3410, Exellor® VA1801 or VA1803, Amplify® GR216, Tafmer® MH5020, MH5040, MH7020, MH7010, or a mixture thereof, in which case they are in a ratio ranging from 0.1/99.9 to 99.9/0.1, preferably 1/2 to 2/1 when they are in a mixture of two.

By way of example, the impact modifier is selected from the following mixtures: Fusabond® N493/Lotader®, in particular Fusabond® N493/Lotader® 5500 or Fusabond® N493/Lotader® 7500.

The impact modifier may also be a PEBA (polyether-block-amide).

The proportion of impact modifier in said composition of said layer (1) is present between 0 and 20%.

In one embodiment, the impact modifier is present between 3 and 20%.

In another embodiment, the impact modifier is present between 10 and 18% by weight relative to the total weight of the constituents of the composition of the layer (1).

In yet another embodiment, the impact modifier is in a proportion by weight of 0% relative to the total weight of the constituents of the composition of the layer (1) and is therefore excluded from the composition of said layer (1).

Regarding the Additive

The additive or additives d. are selected from carbon black, graphite, graphene, carbon fibers, carbon nanotubes, in particular carbon black and carbon nanotubes, an antioxidant, a heat stabilizer, a UV absorber, a light stabilizer, a lubricant, an inorganic filler, a fire-proofing agent, a nucleating agent, a dye, reinforcing fibers, a wax and mixtures thereof.

The plasticizers and impact modifiers in the present application are excluded from the definition of additives.

Said composition of said layer (1) may comprise between 0 and 35% by weight of at least one additive relative to the total weight of the composition.

Said layer (1) may therefore be conductive or non-conductive depending on the presence of carbon black, graphite, graphene, carbon fibers or carbon nanotubes.

Advantageously, one of these additives is an antioxidant.

This antioxidant may be an organic antioxidant or more generally a combination of organic antioxidants, such as a primary antioxidant of the phenol type (for example of the type of Ciba's Irganox® 245 or 1098 or 1010), a secondary phosphite antioxidant, a phenolic or phosphorus-based antioxidant. Amine antioxidants such as Chemtura's Naugard® 445 or polyfunctional stabilizers such as Clariant's Nylostab® S-EED can also be used.

This antioxidant may also be a mineral antioxidant, such as a copper-based antioxidant. As an example of such mineral antioxidants, mention may be made of halides and copper acetates, in particular CuI/KI. Secondarily, other metals such as silver can optionally be considered, but these are known to be less effective. These compounds containing copper are typically associated with alkali metal halides, particularly potassium.

The light stabilizer may be a HALS, which means Hindered Amine Light Stabilizer (for example Ciba's Tinuvin® 770).

The UV absorber is, for example, Ciba's Tinuvin® 312.

In accordance with a first variant, the additive is carbon black, particularly in a proportion of between 5 and 32%, in particular between 15 and 28%, relative to the total weight of said composition of said layer (I). Said additive, which is carbon black, may optionally comprise at least one more additive other than carbon black, graphite, graphene, carbon fibers and carbon nanotubes in a proportion of between 0 and 5% by weight. The proportion of the additive, which is carbon black and optionally of the other relative additive corresponds to d.

According to a second variant, the additive is carbon nanotubes in a proportion of between 0.5 and 10%, particularly between 2 and 7%, in particular between 4 to 5% by weight relative to the total weight of the composition.

It would not depart from the scope of the invention if, in these variants, carbon black were partially replaced by carbon nanotubes or vice versa.

The sum of a.+b.+c.+d. by weight represents 100% of the total weight of the composition. As a result, there can be no constituents other than a., b., c., and d. in the composition.

It is quite obvious that whatever the high and low values of the various constituents a., b., c. and d. are, the total is 100%. In other words, even if the addition of the high value of one of the constituents a., b., c. and d. and of the low values of the other constituents may represent more than 100%, it is quite obvious that a person skilled in the art will vary one or more constituents a., b., c. and d. so that the total of the constituents does not exceed 100% by weight.

Whether the tubular structure consists of a single layer or comprises other layers, as noted hereinbefore, it is located at least partially inside the tank, which means that more than 90% of the total length of the tube is located in the tank and, as a result, said tubular structure is not a structure for transporting fuel between the tank and the motor of a vehicle, because it can be at least partially submerged in the tank, which results, when it is at least partially submerged, in both the inner layer of the said tubular structure and the outer layer of the said tubular structure being in contact with the fuel, at least partially, for the outer layer. In the embodiment wherein the structure is a monolayer structure, the single layer (1) is therefore in contact with the fuel both on the inner face and on the outer face, at least partially for the latter when it is at least partially submerged.

The tubular structure of the invention is also not a tubular structure present in the motor.

The polyamides defined hereinbefore in their generalities, whether they are homopolyamides, copolyamides or alloys, can also be distinguished by their number of carbon atoms per nitrogen atom, it being known that there are as many nitrogen atoms as amide groups (—CO—NH—).

Tubular Structure with an Aliphatic Polyamide being at Least One Polyamide Denoted C Obtained from the Polycondensation of at Least One $C_6$-$C_{18}$ Lactam or from at Least One $C_6$-Cis Aminocarboxylic Acid.

In one embodiment, the tubular structure defined hereinbefore is characterized in that the at least one aliphatic polyamide is at least one polyamide denoted C obtained from the polycondensation of at least one $C_6$-$C_{18}$ lactam, preferably $C_7$-$C_{13}$ lactam, or from at least one $C_6$-$C_{18}$ aminocarboxylic acid, preferably $C_7$-$C_{13}$ aminocarboxylic acid, and having an average number of carbon atoms per nitrogen atom denoted CC ranging from 9 to 18, advantageously from 10 to 18.

Throughout the description, the expression "ranging from . . . to . . . " includes the limits and has the same meaning as the expression "between . . . and . . . "

It is quite obvious that to obtain an average number of carbon atoms per nitrogen atom denoted $C_C$ ranging from 9 to 18 with a polyamide denoted C obtained from the polycondensation of at least one $C_7$ or $C_8$ lactam, or of at least one $C_7$ or $C_8$ aminocarboxylic acid, said polyamide denoted C must be a copolyamide or a polyamide mixture whose second unit has an average number of carbon atoms per nitrogen atom denoted $C_C$ higher than 9 depending on the molar proportion of said second unit.

Advantageously, said at least one aliphatic polyamide is a single polyamide denoted C obtained from the polycondensation of at least one $C_6$-$C_{18}$ lactam, preferably $C_7$-$C_{13}$ lactam, or of at least one $C_6$-$C_{18}$ aminocarboxylic acid, preferably $C_7$-$C_{13}$ aminocarboxylic acid, and having an average number of carbon atoms per nitrogen atom denoted $C_C$ ranging from 9 to 18, advantageously from 10 to 18.

In another embodiment, said constituent a. of said composition further comprises another polyamide selected from:
 at least one polyamide denoted A having an average number of carbon atoms per nitrogen atom denoted $C_A$ ranging from 4 to 8.5, advantageously from 4 to 7;
 at least one polyamide denoted B having a melting temperature higher than or equal to 180° C. and an average number of carbon atoms per nitrogen atom denoted $C_B$ ranging from 7 to 10, advantageously from 7.5 to 9.5;
or a mixture thereof,
the weighted average mass of the melting enthalpies of the polyamides being higher than 25 J/g (DSC),
the average number of carbon atoms per nitrogen atom of the polyamides A, B and C further satisfying the following strict inequation: $C_A < C_B < C_C$.

The polyamide denoted A and the polyamide denoted B, said polyamide denoted B having a melting temperature higher than or equal to 180° C., are polyamides obtained either from the polycondensation of at least one lactam, or of at least one aminocarboxylic acid and having respectively an average number of carbon atoms per nitrogen atom denoted CA ranging from 4 to 8.5, advantageously from 4 to 7, and an average number of carbon atoms per nitrogen atom denoted CB ranging from 7 to 10, advantageously from 7.5 to 9.5, but may also be a PA X'Y' obtained from the polycondensation of a linear or branched aliphatic diamine X', provided that the average number of carbon atoms per nitrogen atom is respected for each of the polyamides A and B.

Advantageously, the difference between the average numbers of carbon atoms per nitrogen atom $(C_B - C_A)$ and/or $(C_C - C_B)$ ranges from 1 to 4, and preferably from 2 to 3.

The melting enthalpy and the melting temperature of the polyamides is determined in accordance with ISO 11357-3: 2013.

The composition of said layer (1) may therefore comprise a polyamide denoted C and a polyamide denoted A, or a polyamide denoted C and a polyamide denoted B, or alternatively a polyamide denoted C, a polyamide denoted A and a polyamide denoted B.

The proportion by mass of the various polyamides in the hereinbefore compositions is variable, which means that one of the polyamides denoted A, B or C is in the majority relative to the sum C+A, C+B or C+A+B.

In a first variant, said constituent a. of said composition further comprises at least one polyamide denoted A having an average number of carbon atoms per nitrogen atom denoted $C_A$ ranging from 4 to 8.5, advantageously from 4 to 7.

Advantageously, the melting temperature of polyamide A is higher than or equal to 210° C.

In a second variant, said constituent a. of said composition further comprises at least one polyamide denoted B having a melting temperature higher than or equal to 180° C. and an average number of carbon atoms per nitrogen atom denoted $C_B$ ranging from 7 to 10, advantageously from 7.5 to 9.5.

Advantageously, the melting temperature of polyamide B is less than or equal to 200° C.

In a third variant, said constituent a. of said composition further comprises at least one polyamide denoted A having an average number of carbon atoms per nitrogen atom denoted $C_A$ ranging from 4 to 8.5, advantageously from 4 to 7, and at least one polyamide denoted B having a melting temperature higher than or equal to 180° C., and an average number of carbon atoms per nitrogen atom denoted $C_B$ ranging from 7 to 10, advantageously from 7.5 to 9.5.

Advantageously, the melting temperature of polyamide A is higher than or equal to 210° C., and/or the melting temperature of polyamide B is less than or equal to 200° C.

Advantageously, said composition of the three variants defined hereinbefore comprises between 34 and 84% by weight of aliphatic polyamide C relative to the total weight of the polyamides present within said composition, preferably between 50 and 80%.

More advantageously, said composition of the three variants defined hereinbefore comprises between 60 and 80% by weight of aliphatic polyamide C relative to the total weight of the polyamides present within said composition.

More advantageously, said composition of the three variants defined hereinbefore comprises between 70 and 80% by weight of aliphatic polyamide C relative to the total weight of the polyamides present within said composition.

When said aliphatic polyamide of the tubular structure is, at least, a polyamide denoted C obtained from the polycondensation of at least one $C_6$-$C_{18}$ lactam, preferably $C_7$-$C_{13}$ lactam, or of at least one $C_6$-$C_{18}$ aminocarboxylic acid, preferably $C_7$-$C_{13}$ aminocarboxylic acid, then said polyamide C is advantageously selected from PA11 and PA12, advantageously PA11.

In the first variant, said polyamide C is advantageously selected from PA11 and PA12, advantageously PA11 and polyamide A is selected from PA6, PA46 and PA66.

In the second variant, said polyamide C is advantageously selected from PA11 and PA12, advantageously PA11 and polyamide B is selected from PA610 and PA612.

In the third variant, said polyamide C is advantageously selected from PA11 and PA12, advantageously PA11, polyamide B is selected from PA610, and PA612 and polyamide A is selected from PA6, PA46 and PA66.

Advantageously, each of the polyamides A, B and C has a melting enthalpy higher than 25 J/g (DSC).

In one embodiment, said tubular structure is characterized in that W in said aliphatic polyamide of formula W/Z is at least one aliphatic repeating unit XY, which is a polyamide denoted B' having a melting temperature higher than or equal to 180° C., and an average number of carbon atoms per nitrogen atom denoted CB' ranging from 7 to 10, advantageously from 7.5 to 9.5, or a polyamide denoted C' having an average number of carbon atoms per nitrogen atom denoted CC' ranging from 9 to 18, advantageously from 10 to 18.

In another embodiment, the tubular structure defined hereinbefore is characterized in that W in said at least one aliphatic polyamide of formula W/Z is an aliphatic repeating unit XY, which is a polyamide denoted B' having a melting temperature higher than or equal to 180° C., and an average number of carbon atoms per nitrogen atom denoted CB' ranging from 7 to 10, advantageously from 7.5 to 9.5, or a polyamide denoted C' having an average number of carbon atoms per nitrogen atom denoted CC' ranging from 9 to 18, advantageously from 10 to 18.

The repeating units resulting from the polycondensation of lactams and/or aminocarboxylic acid are therefore excluded from the polyamides denoted B' or denoted C'.

Advantageously, said aliphatic polyamide is a single polyamide denoted B' or a single polyamide denoted C'.

In one embodiment, said constituent a. of said composition consisting of at least one aliphatic polyamide denoted B' or denoted C' further comprises another polyamide selected from:
  at least one polyamide denoted A having an average number of carbon atoms per nitrogen atom denoted $C_A$ ranging from 4 to 8.5, advantageously from 4 to 7;
  at least one polyamide denoted B" having a melting temperature higher than or equal to 180° C. and an average number of carbon atoms per nitrogen atom denoted $C_B$ ranging from 7 to 10, advantageously from 7.5 to 9.5, when said aliphatic polyamide is C',
  at least one polyamide denoted C" having an average number of carbon atoms per nitrogen atom denoted $C_{C''}$ ranging from 9 to 18, advantageously from 10 to 18, when said aliphatic polyamide is B';
or a mixture thereof,
the weighted average mass of the melting enthalpies of the polyamides being higher than 25 J/g (DSC),
the average number of carbon atoms per nitrogen atom in units A, B', B", C' and C" further satisfying the following strict inequation: $C_A < C_{B'}$ or $C_{B''} < C_{C'}$ or $C_{C'''}$.

The polyamide denoted A is a polyamide obtained as described hereinbefore, the polyamide denoted B" is a polyamide obtained as described hereinbefore for polyamide B and the polyamide denoted C" is a polyamide obtained as described hereinbefore for polyamide C, provided that the average number of carbon atoms per nitrogen atom is respected for each of the polyamides A, B" and C".

Advantageously, the difference between the average numbers of carbon atoms per nitrogen atom ($C_{B'}-C_A$) and/or ($C_{C'}-C_{B''}$) and/or ($C_{C''}-C_{B''}$) ranges from 1 to 4, and preferably from 2 to 3.

The composition of said layer (1) may therefore comprise:
  a polyamide denoted B' and a polyamide denoted A,
  a polyamide denoted B' and a polyamide denoted C",
  a polyamide denoted B', a polyamide denoted A and a polyamide denoted C",
  a polyamide denoted C' and a polyamide denoted A,
  a polyamide denoted C' and a polyamide denoted B", a polyamide denoted C', a polyamide denoted A and a polyamide denoted B".

The proportion by mass of the various polyamides in the hereinbefore compositions is variable, which means that one of the polyamides denoted A, B' or C" is the majority relative to the total of the polyamides A+B'+C" or that one of the polyamides denoted A, B" or C' is the majority relative to the total of the polyamides A+B"+C' present in the composition.

In a first variant, said at least one aliphatic polyamide denoted B' further comprises at least one polyamide denoted A having an average number of carbon atoms per nitrogen atom denoted $C_A$ ranging from 4 to 8.5, advantageously from 4 to 7.

In a second variant, said at least one aliphatic polyamide denoted B' further comprises at least one polyamide denoted C" having an average number of carbon atoms per nitrogen atom denoted $C_{C''}$ ranging from 9 to 18, advantageously from 10 to 18.

In a third variant, said at least one aliphatic polyamide denoted B' further comprises at least one polyamide denoted A having an average number of carbon atoms per nitrogen atom denoted $C_A$ ranging from 4 to 8.5, advantageously from 4 to 7, and at least one polyamide denoted C" having an average number of carbon atoms per nitrogen atom denoted $C_{C''}$ ranging from 9 to 18, advantageously from 10 to 18.

In a fourth variant, said at least one aliphatic polyamide denoted C' further comprises at least one polyamide denoted A having an average number of carbon atoms per nitrogen atom denoted $C_A$ ranging from 4 to 8.5, advantageously from 4 to 7.

In a fifth variant, said at least one aliphatic polyamide denoted C' further comprises at least one polyamide denoted B" having a melting temperature higher than or equal to 180° C. and an average number of carbon atoms per nitrogen atom denoted $C_{B'}$ ranging from 7 to 10, advantageously from 7.5 to 9.5.

In a sixth variant, said at least one aliphatic polyamide denoted C' further comprises at least one polyamide denoted A having an average number of carbon atoms per nitrogen atom denoted $C_A$ ranging from 4 to 8.5, advantageously from 4 to 7, and at least one polyamide denoted B" having a melting temperature higher than or equal to 180° C., and an average number of carbon atoms per nitrogen atom denoted $C_{B''}$ ranging from 7 to 10, advantageously from 7.5 to 9.5.

Advantageously, the melting temperature of polyamide A is higher than or equal to 210° C., and/or the melting temperature of polyamide C" is less than or equal to 200° C., and/or the temperature of polyamide B" is higher than or equal to 180° C.

Advantageously, said composition of three of the six variants defined hereinbefore comprises between 34 and 84% by weight of aliphatic polyamide B' relative to the total weight of the polyamides present within said composition, preferably between 50 and 80%.

More advantageously, said composition of three of the six variants defined hereinbefore comprises between 60 and 80% by weight of aliphatic polyamide B' relative to the total weight of the polyamides present within said composition.

More advantageously, said composition of three of the six variants defined hereinbefore comprises between 70 and 80% by weight of aliphatic polyamide B' relative to the total weight of the polyamides present within said composition.

Advantageously, said composition of three of the six variants defined hereinbefore comprises between 34 and 84% by weight of aliphatic polyamide C' relative to the total weight of the polyamides present within said composition, preferably between 50 and 80%.

More advantageously, said composition of three of the six variants defined hereinbefore comprises between 60 and 80% by weight of aliphatic polyamide C' relative to the total weight of the polyamides present within said composition.

More advantageously, said composition of three of the six variants defined hereinbefore comprises between 70 and 80% by weight of aliphatic polyamide C' relative to the total weight of the polyamides present within said composition.

When the said at least one aliphatic polyamide of the tubular structure is an aliphatic repeating unit, which is a polyamide denoted B', then the said polyamide B' is advantageously selected from PA610 and PA612, advantageously PA610.

When the said at least one aliphatic polyamide of the tubular structure is an aliphatic repeating unit, which is a polyamide denoted C', then the said polyamide C' is advantageously selected from PA1012, PA618 and PA1010.

In the first variant, said polyamide B' is advantageously selected from PA610 and PA612, advantageously PA610 and polyamide A is selected from PA6, PA46 and PA66.

In the second variant, said polyamide B' is advantageously selected from PA610 and PA612, advantageously PA610 and polyamide C" is selected from PA11, PA12, PA1012, PA618 and PA1010.

In the third variant, said polyamide B' is advantageously selected from PA610 and PA612, advantageously PA610, polyamide A is selected from PA6, PA46 and PA66 and polyamide C" is selected from PA11, PA12, PA1012, PA618 and PA1010.

In the fourth variant, said polyamide C' is advantageously selected from PA1012, PA618 and PA1010, and polyamide A is selected from PA6, PA46 and PA66.

In the fifth variant, said polyamide C' is advantageously selected from PA1012, PA618 and PA1010, and polyamide B" is advantageously selected from PA610 and PA612, advantageously PA610.

In the sixth variant, said polyamide C' is selected from PA1012, PA618 and PA1010, polyamide A is selected from PA6, PA46 and PA66, and polyamide B" is advantageously selected from PA610 and PA612, advantageously PA610.

Advantageously, each of the polyamides A, B', B", C' and C" has a melting enthalpy higher than 25 J/g (DSC).

Advantageously, when the structure consists of a single layer, which is the layer (1), the composition of said layer (1) is devoid of an additive selected from carbon black, graphite, graphene, carbon fibers and carbon nanotubes.

In this embodiment, the tubular structure is therefore non-conductive and devoid of any other layer.

All the characteristics of the various constituents a., b., c. and d. defined hereinbefore are valid for this particular embodiment with the exception of the additives selected from carbon black, graphite, graphene, carbon fibers and carbon nanotubes.

Advantageously, when the tubular structure is a monolayer structure, the thickness of said layer (1) is at least 600 μm.

Advantageously, said monolayer tubular structure devoid of additive selected from carbon black, graphite, graphene, carbon fibers and carbon nanotubes is also devoid of plasticizer.

Tubular Structure in which the Additive is at Least Carbon Black

In one embodiment, said tubular structure, defined hereinbefore, comprises an additive in the layer (1) which is at least carbon black.

Other additives may be present in said layer (1), but they are then non-conductive.

The tubular structure may be monolayer or multilayer. Advantageously, it is multilayer.

In a first variant, said tubular structure defined hereinbefore is characterized in that said composition of said layer (1) comprises:
a. between 39% and 95% by weight, in particular between 41% to 85% by weight of at least one aliphatic polyamide,
b. between 0% and 4% by weight, preferably between 0 and 2% of a plasticizer,
c. between 0% and 20% by weight of at least one impact modifier,
d. between 5% and 32%, in particular between 15 and 28% by weight of an additive, which is carbon black, and
between 0 and 5% by weight of at least one additive other than carbon black, graphite, graphene, carbon fibers and carbon nanotubes,
the sum a.+b.+c.+d. being equal to 100%.

The additives, plasticizers, impact modifiers are as defined hereinbefore.

In one embodiment, said tubular structure defined hereinbefore is characterized in that said composition of said layer (1) consists of:
a. between 39% and 95% by weight, in particular between 41% to 85% by weight of at least one aliphatic polyamide,
b. between 0% and 4% by weight, preferably between 0 and 2% of a plasticizer,
c. between 0% and 20% by weight of at least one impact modifier,
d. between 5% and 32%, in particular between 15 and 28% by weight of an additive, which is carbon black, and
between 0 and 5% by weight of at least one additive other than carbon black, graphite, graphene, carbon fibers and carbon nanotubes,
the sum a.+b.+c.+d. being equal to 100% of the total weight of the composition.

In a second variant, said tubular structure defined hereinbefore is characterized in that said composition of said layer (1) comprises:
a. between 39% and 85% by weight, in particular between 41% and 75% by weight of at least one aliphatic polyamide,
b. between 0% and 4% by weight, preferably between 0 and 2% of a plasticizer,
c. between 10% and 18% of at least one impact modifier,
d. between 5% and 32%, in particular between 15 and 28% by weight of an additive, which is carbon black, and
between 0 and 5% by weight of at least one additive other than carbon black, graphite, graphene, carbon fibers and carbon nanotubes,
the sum a.+b.+c.+d. being equal to 100%.

In one embodiment, said tubular structure defined hereinbefore is characterized in that said composition of said layer (1) consists of:
a. between 39% and 85% by weight, in particular between 41% and 75% by weight of at least one aliphatic polyamide,
b. between 0% and 4% by weight, preferably between 0 and 2% of a plasticizer,
c. between 10% and 18% of at least one impact modifier,
d. between 5% and 32%, in particular between 15 and 28% by weight of an additive, which is carbon black, and
between 0 and 5% by weight of at least one additive other than carbon black, graphite, graphene, carbon fibers and carbon nanotubes,
the sum a.+b.+c.+d. being equal to 100% of the total weight of the composition.

Tubular Structure in which the Additive is at Least Carbon Nanotubes

In one embodiment, said tubular structure, defined hereinbefore, comprises an additive in the layer (1) which is at least carbon nanotubes.

Other additives may be present in said layer (1), but they are then non-conductive.

Said tubular structure may be monolayer or multilayer.

In a first variant, said tubular structure defined hereinbefore is characterized in that said composition of said layer (1) comprises:
a. between 70% and 99.5% by weight, particularly between 80% and 98% by weight, in particular 80% and 96% by weight of at least one aliphatic polyamide,
b. between 0% and 4% by weight, preferably between 0 and 2% of a plasticizer,
c. between 0% and 20% of at least one impact modifier,
d. between 0.5% and 10%, preferably between 2 and 7%, in particular between 4 and 5% by weight of an additive which is carbon nanotubes, and
between 0 and 19%, preferably between 0 and 22%, in particular between 0 and 24% by weight of at least one additive other than carbon black, graphite, graphene, carbon fibers and carbon nanotubes,
the sum a.+b.+c.+d. being equal to 100%.

In one embodiment, said tubular structure defined hereinbefore is characterized in that said composition of said layer (1) consists of:
a. between 70% and 99.5% by weight, particularly between 80% and 98% by weight, in particular 80% and 96% by weight of at least one aliphatic polyamide,
b. between 0% and 4% by weight, preferably between 0 and 2% of a plasticizer,
c. between 0% and 20% of at least one impact modifier,
d. between 0.5% and 10%, preferably between 2 and 7%, in particular between 4 and 5% by weight of an additive which is carbon nanotubes, and
between 0 and 19%, preferably between 0 and 22%, in particular between 0 and 24% by weight of at least one additive other than carbon black, graphite, graphene, carbon fibers and carbon nanotubes,
the sum a.+b.+c.+d. being equal to 100% of the total weight of the composition.

In a second variant, said tubular structure defined hereinbefore is characterized in that said composition of said layer (1) comprises
a. between 70% and 89.5% by weight, particularly between 80% and 88% by weight, in particular 80% and 86% by weight of at least one aliphatic polyamide,
b. between 0% and 4% by weight, preferably between 0 and 2% of a plasticizer,
c. between 10% and 18% of at least one impact modifier,
d. between 0.5% and 10%, preferably between 2 and 7%, in particular between 4 and 5% by weight of an additive which is carbon nanotubes, and
between 0 and 19%, preferably between 0 and 22%, in particular between 0 and 24% by weight of at least one additive other than carbon black, graphite, graphene, carbon fibers and carbon nanotubes,
the sum a.+b.+c.+d. being equal to 100%.

In one embodiment, said tubular structure defined hereinbefore is characterized in that said composition of said layer (1) consists of:
a. between 70% and 89.5% by weight, particularly between 80% and 88% by weight, in particular 80% and 86% by weight of at least one aliphatic polyamide,
b. between 0% and 4% by weight, preferably between 0 and 2% of a plasticizer,
c. between 10% and 18% of at least one impact modifier, d. between 0.5% and 10%, preferably between 2 and 7%, in particular between 4 and 5% by weight of an additive which is carbon nanotubes, and between 0 and 19%, preferably between 0 and 22%, in particular between 0 and 24% by weight of at least one additive other than carbon black, graphite, graphene, carbon fibers and carbon nanotubes, the sum a.+b.+c.+d. being equal to 100% of the total weight of the composition.

Advantageously, the layer (1) of one of the tubular structures defined hereinbefore is devoid of plasticizer.

Tubular Structure Comprising at Least One Layer (1) and at Least One Layer (2)

In another embodiment, the hereinbefore defined tubular structure is characterized in that it comprises at least one second layer (2) that is conductive or non-conductive, in particular conductive, said layer (1) being located above or below said layer (2).

The expression "above" means outside the tubular structure, said layer (1) therefore being the outer layer and said layer (2) being the inner layer.

The expression "below" means inside the tubular structure, said layer (1) therefore being the inner layer and said layer (2) being the outer layer.

The tubular structure then corresponds to a multilayer structure (MLT).

Advantageously, said layer (1) is located above said layer (2).

Advantageously, the thickness of the layer (1) in the MLT structure is between about 600 µm and about 950 µm.

Advantageously, the thickness of said layer (2) in the MLT structure represents less than 25% of the total thickness of the MLT.

Advantageously, when said second layer (2) is conductive, its thickness is between 50 and 200 µm.

Advantageously, said tubular structure comprising at least one second layer (2) is characterized in that said second layer (2) comprises at least one aliphatic polyamide or fluorinated materials such as PVDF or functionalized fluorinated materials such as the functionalized ethylene-tetrafluoroethylene (ETFE) copolymer, the functionalized ethylene-tetrafluoroethylene-hexafluoropropylene (EFEP) copolymer, a tetrafluoroethylene-perfluoro (alkylvinylether)-chlorotrifluoroethylene (CPT) copolymer.

All the technical characteristics detailed hereinbefore for the layer (1) of the tubular structure are valid for this embodiment in which at least one layer (1) and at least one layer (2) are present.

Said at least one second layer (2) is conductive or non-conductive, which means that it may contain additives selected from carbon black, graphite, graphene, carbon fibers and carbon nanotubes and said layer (1) is conductive or non-conductive.

In a first variant, said at least one second layer (2) is devoid of plasticizer.

In a second variant, said at least one second layer (2) is conductive and comprises between 0.5 and 10%, preferably between 2% and 7%, in particular between 4 and 5% by weight of an additive, which is carbon nanotubes, or between 5% and 24%, in particular between 15 and 24% by weight of an additive, which is carbon black, relative to the total weight of the composition of said layer (2).

In a third variant, said at least one second layer (2) is conductive and comprises between 0.5 and 10%, preferably between 2% and 7%, in particular between 4 and 5% by weight of an additive, which is carbon nanotubes, or between 5% and 24%, in particular between 15 and 24% by weight of an additive, which is carbon black, relative to the total weight of the composition of said layer (2) and is devoid of plasticizer.

In a fourth variant, said at least one second layer (2) is conductive and comprises between 0.5 and 10%, preferably between 2% and 7%, in particular between 4 and 5% by weight of an additive, which is carbon nanotubes, or between 5% and 24%, in particular between 15 and 24% by weight of an additive, which is carbon black, relative to the total weight of the composition of said layer (2) and said layer (1) is non-conductive.

In a fifth variant, said at least one second layer (2) is conductive and comprises between 0.5 and 10%, preferably between 2% and 7%, in particular between 4 and 5% by weight of an additive, which is carbon nanotubes, or between 5% and 24%, in particular between 15 and 24% by weight of an additive, which is carbon black, relative to the total weight of the composition of said layer (2), said layer (2) being devoid of plasticizer and said layer (1) is non-conductive.

In a sixth variant, said at least one second layer (2) is conductive and comprises between 0.5 and 10%, preferably between 2% and 7%, in particular between 4 and 5% by weight of an additive, which is carbon nanotubes, or between 5% and 24%, in particular between 15 and 24% by weight of an additive, which is carbon black, relative to the total weight of the composition of said layer (2), said layer (2) being devoid of plasticizer and said layer (1) is non-conductive and said layer (1) is devoid of plasticizer.

In another embodiment, the hereinbefore defined tubular structure is characterized in that it comprises two conductive or non-conductive layers (2), in particular conductive, said layer (1) being located between the said two layers (2).

The expression "barrier layer" means a layer of low permeability to fuels, particularly to alcoholic gasolines, and which consequently allows very little passage of fuel, particularly alcoholic gasolines, into the atmosphere.

In particular, the expression "barrier layer" means that the proportion of fuel, in particular of alcohol-based gasoline emitted to the atmosphere is less than 20 g·mm/m²·day as determined with a CE10 fuel at 60° C.

The fuel permeability, particularly gasoline permeability, are measured at 60° C. according to a gravimetric method with CE10: isooctane/toluene/ethanol=45/45/10 vol % and CE85: isooctane/toluene/ethanol=7.5/7.5/85 vol % on plates made of a polymer material. The instant permeability is zero during the induction period, then it increases progressively up to a value at equilibrium that corresponds to the permeability value in the permanent regime. This value obtained in the permanent regime is considered as being the material's permeability.

This bather property is essential for tubes in contact with the atmosphere.

In the case of the tubular structures of the invention, the latter being submerged in the fuel, a bather layer is not necessary. As a result, advantageously, In one variant, the tubular structure defined hereinbefore comprising at least one second layer (2) is devoid of a barrier layer and the tubular structure then consists only of aliphatic polyamides.

Said aliphatic polyamide of the layer (2) is as defined hereinbefore and may comprise the same additives, impact modifier, plasticizer as the polyamide of the layer (1) and this in ranges of proportions identical to those of the layer (1).

Said fluorinated material may comprise additives similar to those of the polyamide of the layer (1) and this in ranges of proportions identical to those of the layer (1). Advantageously, said second layer (2) comprises a composition comprising at least one aliphatic polyamide, as defined for said layer (1).

In another embodiment, the tubular structure defined hereinbefore and comprising at least one second layer (2) also comprises a third layer (2'), identical to or different from the second layer (2).

Advantageously, said layer (2') comprises a composition comprising a polyamide as that defined for said layer (2).

Advantageously, said layers (2) and (2') are conductive and the layer (1) is non-conductive.

Advantageously, when the tubular structure comprises at least one layer (1) and at least one layer (2), the thickness of said layer (1) is between 60% and 95% of the total thickness of the tube.

According to another aspect, the present invention relates to the use of a tubular structure as defined hereinbefore, for transporting fuels into the tank, in particular for transporting gasoline into the tank.

All the characteristics defined hereinbefore for the tubular structure are valid for this use.

According to another aspect, the present invention relates to the use of a tubular structure as defined hereinbefore, in order to satisfy an extractable test, said test particularly consisting of filling said multilayer tubular structure MLT with FAM-B alcohol-based gasoline and heating the assembly at 60° C. for 96 hours, then emptying it by filtering it into a beaker, then allowing the filtrate from the beaker to evaporate at ambient temperature and finally weighing this residue, the proportion of which must be less than or equal to approximately 10 g/m$^2$ of internal tube surface, preferably less than or equal to 6 g/m$^2$.

According to another aspect, the present invention relates to a method for measuring the extractables of a tubular structure, as defined hereinbefore, comprising the following steps:
1) filling said tubular structure with FAM-B alcohol-based gasoline,
2) heating said tubular structure submerged in said gasoline at 60° C. for 96 hours,
3) emptying with simultaneous filtration into a beaker,
4) evaporating the filtrate from the beaker at ambient temperature
5) weighing the residue after evaporation, the proportion of which must be less than or equal to about 6 g/m$^2$ of internal tube surface.

EXAMPLES

The invention will now be described in more detail with the aid of the following non-limiting examples.

The following structures were prepared by extrusion:

The multi-layer tubes are manufactured by co-extrusion. An industrial McNeil multilayer extrusion line is used, equipped with 5 extruders, connected to a multilayer extrusion head with spiral mandrels.

The screws used are extrusion monoscrews having screw profiles adapted to polyamides. In addition to the 5 extruders and the multilayer extrusion head, the extrusion line comprises:
 a die-punch assembly, located at the end of the coextrusion head; the internal diameter of the die and the external diameter of the punch are selected according to the structure to be produced and the materials of which it is composed, as well as the dimensions of the tube and the line speed;
 a vacuum tank with an adjustable vacuum level. In this tank water circulates generally maintained at 20° C., in which a gauge is submerged making it possible to shape the tube to its final dimensions. The diameter of the gauge is adapted to the dimensions of the tube to be produced, typically from 8.5 to 10 mm for a tube with an external diameter of 8 mm and a thickness of 1 mm;
 a succession of cooling tanks in which water is maintained at around 20° C., allowing the tube to be cooled along the path from the head to the drawing bench;
 a diameter meter;
 a drawing bench.

The configuration with 5 extruders is used to produce tubes ranging from 2 layers to 5 layers. In the case of structures whose number of layers is less than 5, several extruders are then fed with the same material.

In the case of structures comprising 6 layers, an additional extruder is connected and a spiral mandrel is added to the existing head, in order to make the inner layer, in contact with the fluid.

Before the tests, in order to ensure the best properties for the tube and good extrusion quality, it is verified that the extruded materials have a residual moisture content before extrusion of less than 0.08%. Otherwise, an additional step of drying the material before the tests, generally in a vacuum dryer, is carried out overnight at 80° C.

The tubes, which satisfy the characteristics disclosed in the present patent application, were removed, after stabilization of the extrusion parameters, the dimensions of the tubes in question no longer changing over time. The diameter is controlled by a laser diameter meter installed at the end of the line.

Generally, the line speed is typically 20 m/min. It generally ranges from 5 to 100 m/min.

The screw speed of the extruders depends on the thickness of the layer and on the diameter of the screw, as is known to those skilled in the art.

In general, the temperatures of the extruders and of the tools (head and connector) must be adjusted so as to be sufficiently higher than the melting temperature of the compositions in question, so that they remain in the molten state, thus preventing them from solidifying and jamming the machine.

The tubular structures were tested on different parameters (Table I).

All the layer thicknesses are expressed in µm.

The amount of extractables, the bursting pressure properties and the flexibility properties were determined.

| Examples and contrasting examples | Extractables (3) | Bursting pressure (1) | Flexibility (2) |
|---|---|---|---|
| Contrasting example c1: PA12-TL 1000 µm thickness monolayer | >50 | + | +++++ |
| Contrasting example c2: PA11-TL 1000 µm thickness monolayer | >40 | ++ | ++++++ |
| Contrasting example c3: PA610-TL 1000 µm thickness monolayer | >40 | ++++ | ++++ |
| Contrasting example c4: PA612-TL 1000 µm thickness monolayer | >40 | +++ | ++++ |
| Contrasting example c5 (multilayer): PA12-TL//PA612-TL//PA12-TL thicknesses: 100//800/100 µm | >40 | +++ | +++++ |

-continued

| Examples and contrasting examples | Extractables (3) | Bursting pressure (1) | Flexibility (2) |
|---|---|---|---|
| Example 1: PA11-NoPlast 1000 μm thickness monolayer | <4 | ++ | +++ |
| Example 2: PA610-NoPlast 1000 μm thickness monolayer | <4 | ++++ | ++ |
| Example 3: PA612-NoPlast 1000 μm thickness monolayer | <4 | +++ | ++ |
| Example 4: PA612-NoPlast-B 1000 μm thickness monolayer | <4 | ++++ | + |
| Example 5 (multilayer): PA12-NoPlast//PA612-NoPlast thicknesses: 100//900 μm | <5 | +++ | ++ |
| Example 6 (multilayer): PA12-NoPlast//PA612-NoPlast//PA12-NoPlast thicknesses: 100//800//100 μm | <5 | +++ | +++ |
| Example 7 (multilayer): PA11-NoPlast//PA612-NoPlast//PA11-NoPlast thicknesses: 100//800//100 μm | <4 | +++ | +++ |
| Example 8 (multilayer): PA11-NoPlast//PA610-NoPlast//PA11-NoPlast thicknesses: 100//800//100 μm | <4 | ++++ | +++ |
| Example 9 (multilayer): PA11-NoPlast//PA610-NoPlast//PA11cond-NoPlast thicknesses: 100//800//100 μm | <4 | ++++ | ++ |
| Example 10 (multilayer): EFEPc//PA610-NoPlast//EFEPc thicknesses: 100//800//100 μm | <2 | ++++ | ++ |
| Example 11 (multilayer): EFEPc//PA11-NoPlast//EFEPc thicknesses: 100//800//100 μm | <2 | ++ | ++ |
| Example 12 (multilayer): PA12-NoPlast//Binder-NoPlast//PA6-NoPlast thicknesses: 100//100//800 μm | <5 | ++++ | ++ |
| Example 13 (multilayer): PA12-NoPlast//Binder-NoPlast//PA6-NoPlast//Binder-NoPlast//PA12-NoPlast thicknesses: 100//100//600//100//100 μm | <5 | +++ | +++ |
| Example 14 (multilayer): PA11-TL//PA610-NoPlast thicknesses: 100//900 μm | <6 | ++++ | +++ |
| Example 15: PA11-P 1000 μm thickness monolayer | <9 | ++ | +++++ |

(1) Bursting pressure is the bursting pressure (according to DIN 53758) after at least 96 hours with FAM-B biogas inside, so a value high enough to withstand the pressure is sought. The higher the number of "+", the better the bursting pressure.

(2) Flexibility and flexural modulus (according to ISO 178) on the tube when conditioned at 23° C. in RH50. The lower the modulus, the higher the flexibility, which is favorable for mounting the tube. The higher the number of "+", the better the flexibility.

(3) Extractables. This test consisting of a tube filled with FAM-B alcohol-based gasoline at 60° C. for 96 hours, then emptied and filtered into a beaker which is then allowed to evaporate and the residue of which is weighed, the latter preferably being less than or equal to 6 g/m2 (of internal surface of the tube). The FAM B alcohol-based gasoline is disclosed in standard DIN 51604-1:1982, DIN 51604-2:1984 and DIN 51604-3: 1984. In brief, FAM A alcohol-based gasoline is first prepared with a mixture of 50% toluene, 30% isooctane, 15% di-isobutylene and 5% ethanol and then FAM B Compositions PA12-TL denotes a polyamide 12-based composition, containing 6% plasticizer, 6% EPR1, and 1.2% organic stabilizers. The melting temperature of this composition is 175° C.

PA11-TL denotes a polyamide 11-based composition, containing 5% plasticizer, 6% impact modifier of the ethylene/ethyl acrylate/anhydride type in a mass ratio of 68.5/30/1.5 (MFI 6 at 190° C. under 2.16 kg), and 1.2% organic stabilizers. The melting temperature of this composition is 185° C.

PA12-NoPlast=PA12-TL without the plasticizer (the latter is replaced by PA12)

PA11-NoPlast=PA11-TL without the plasticizer (the latter is replaced by PA11)

PA610-TL=PA610+12% EPR1 impact modifier+organic stabilizer+10% plasticizer

PA610-NoPlast=PA610-TL without the plasticizer (the latter is replaced by PA610)

PA612-TL=PA612+12% EPR1 impact modifier+organic stabilizer+9% plasticizer

PA612-NoPlast=PA612-TL without the plasticizer (the latter is replaced by PA612)

PA612-NoPlast-B=PA612-TL without the plasticizer or EPR1 (these are replaced by PA612)

PA11cond-noplast=PAU of Mn 15000+9% EPR1+26% Ensaco type carbon black 250 G

PA6-NoPlast=PA6+12% EPR1 impact modifier+organic stabilizer

Binder-NoPlast=Composition based on 48.8% PA612 (as defined elsewhere), 30% PA6 (as defined elsewhere), and 20% EPR1 type impact modifier, and 1.2% organic stabilizers.

EFEPc=Functionalized EFEP and Daikin Neoflon RP5000AS type conductor

PA11-P=denotes a polyamide 11-based composition, containing 1% plasticizer, 6% ethylene/ethyl acrylate/anhydride impact modifier in a mass ratio of 68.5/30/1.5 (MFI 6 at 190° C. under 2.16 kg), and 1.2% organic stabilizers. The melting temperature of this composition is 188° C.

Composition Constituents:
- PA12: Polyamide 12 of Mn (number-average molecular mass) 35000. The melting temperature is 178° C.; its melting enthalpy is 54 kJ/m2
- PAU: Polyamide 11 of Mn (number-average molecular mass) 29000. The melting temperature is 190° C.; its melting enthalpy is 56 kJ/m2
- PA610: Polyamide 6.10 of Mn (number-average molecular mass) 30000. The melting temperature is 223° C.; its melting enthalpy is 61 kJ/m2
- PA612: Polyamide 6.12 of Mn (number-average molecular mass) 29000. The melting temperature is 218° C.; its melting enthalpy is 67 kJ/m2
- PA6: Polyamide 6 of Mn (number-average molecular mass) 28000. The melting temperature is 220° C.; its melting enthalpy is 68 kJ/m2
- EPR1: Designating an EPR functionalized by a reactive group with anhydride function (at 0.5-1% by mass), of MFI 9 (at 230° C., below) 10 kg, of Exxellor® VA1801 from Exxon.
- Organic stabilizer=1.2% organic stabilizers consisting of 0.8% phenol (Lowinox® 44B25 from Great Lakes), 0.2% phosphite (Irgafos® 168 from Ciba, 0.2% UV stabilizer (Tinuvin® 312 from Ciba).
Plasticizer=BBSA (benzyl butyl sulfonamide)

The invention claimed is:

1. A partially annulated flexible tubular structure located at least partially inside a fuel tank of a vehicle, said structure being at least partially submerged in said tank and for use in transporting fuel into said tank,
    said tubular structure comprising at least one layer (1) having a composition comprising:
    a. between 39% and 100% by weight, of at least one aliphatic polyamide of formula W/Z wherein:
        W is an aliphatic repeating unit obtained from the polycondensation of at least one $C_6$-$C_{18}$ lactam, or at least one $C_6$-$C_{18}$ aminocarboxylic acid, or is an aliphatic repeating unit XY having an average number of carbon atoms per denoted nitrogen atom ranging from 6 to 18, obtained from the polycondensation of:
            at least one $C_6$-$C_{18}$ diamine X, said diamine being selected from a linear or branched aliphatic diamine or a mixture thereof, and
            at least one $C_6$-$C_{18}$ aliphatic dicarboxylic acid Y; and
        Z is at least one optional polyamide repeating unit, Z being present at up to 30% by weight relative to the total weight W/Z,
    b. between 0% and 4% by weight of at least one plasticizer,
    c. between 0% and 20% of at least one impact modifier,
    d. between 0% and 37% by weight of at least one additive,
    the sum of a.+b.+c.+d. being equal to 100%,
    wherein the partially annulated flexible tubular structure excludes fuel transport structures running from the tank to a motor of the vehicle or in the motor of the vehicle,
    wherein said structure comprises at least one second layer (2) that is conductive or non-conductive, said layer (1) being located below said layer (2).

2. The tubular structure according to claim 1, wherein the layer (1) is devoid of plasticizer.

3. The tubular structure according to claim 1, wherein said structure is annulated over at least 10% of its length.

4. The tubular structure according to claim 1, wherein at least 90% of the length of said structure is inside the tank.

5. The tubular structure according to claim 1, wherein at least 30% of the length of said structure is submerged in the fuel tank.

6. The tubular structure according to claim 1, wherein said structure comprises at least one second layer (2) that is conductive.

7. The tubular structure according to claim 1, wherein said second layer (2) comprises at least one aliphatic polyamide or fluorinated materials selected from the group consisting of polyvinylidene fluoride (PVDF), functionalized fluorinated materials, functionalized ethylene-tetrafluoroethylene (ETFE) copolymer, functionalized ethylene-tetrafluoroethylene-hexafluoropropylene (EFEP) copolymer, and tetrafluoroethylene-perfluoro (alkylvinylether)-chlorotrifluoroethylene (CPT) copolymer.

8. The tubular structure according to claim 1, wherein said structure is devoid of a barrier layer, said second layer (2) comprising at least one aliphatic polyamide.

9. The tubular structure according to claim 1 wherein said tubular structure passes an extractable test, said test consisting of:
    filling said tubular structure with FAM-B alcohol-based gasoline,
    heating the gasoline filled tubular structure at 60° C. for 96 hours,
    emptying the gasoline from the tubular structure by filtering the gasoline into a beaker,
    allowing the gasoline filtrate from the beaker to evaporate at ambient temperature, and
    weighing the gasoline filtrate residue, the proportion of which must be less than or equal to approximately 10 $g/m^2$ of internal tube surface for the tubular structure to pass the extractable test.

10. The tubular structure according to claim 1, wherein said at least one aliphatic polyamide of constituent a. comprises at least one polyamide denoted C obtained from the polycondensation of at least one $C_6$-$C_{18}$ lactam, or of at least one $C_6$-$C_{18}$ aminocarboxylic acid, and having an average number of carbon atoms per nitrogen atom denoted $C_C$ ranging from 9 to 18.

11. The tubular structure according to claim 10, wherein said at least one aliphatic polyamide of constituent a. further comprises another polyamide selected from the group consisting of:
    at least one polyamide denoted A having an average number of carbon atoms per nitrogen atom denoted $C_A$ ranging from 4 to 8.5;
    at least one polyamide denoted B having a melting temperature higher than or equal to 180° C. and an average number of carbon atoms per nitrogen atom denoted $C_B$ ranging from 7 to 10;
    and a mixture thereof,
    the weighted average mass of the melting enthalpies of the polyamides A, B and C being higher than 25 J/g (DSC),
    the average number of carbon atoms per nitrogen atom of the polyamides A, B and C further satisfying the following strict inequation: $C_A < C_B < C_C$.

12. The tubular structure according to claim 11, wherein the composition comprises between 34 and 84% by weight of aliphatic polyamide C relative to the total weight of the polyamides present within said composition.

13. The tubular structure according to claim 11,
    wherein polyamide A is selected from the group of PA 6, PA 46, and PA 66;
    wherein polyamide B is selected from the group of PA 610 and PA 612; and
    wherein polyamide C is selected from the group of PA 11 and PA 12.

14. The tubular structure according to claim 1, wherein the at least one aliphatic polyamide of formula W/Z comprises at least one aliphatic repeating unit XY, which includes either a polyamide denoted B' having a melting temperature higher than or equal to 180° C., and an average number of carbon atoms per nitrogen atom denoted $C_{B'}$ ranging from 7 to 10, or a polyamide denoted C' having an average number of carbon atoms per nitrogen atom denoted $C_{C'}$ ranging from 9 to 18.

15. The tubular structure according to claim 14, wherein the at least one aliphatic polyamide of formula W/Z further comprises another polyamide selected from the group of:
    at least one polyamide denoted A having an average number of carbon atoms per nitrogen atom denoted $C_A$ ranging from 4 to 8.5;
    at least one polyamide denoted B" having a melting temperature higher than or equal to 180° C. and an average number of carbon atoms per nitrogen atom denoted $C_B$ ranging from 7 to 10 when said aliphatic polyamide comprises polyamide C';

at least one polyamide denoted C" having an average number of carbon atoms per nitrogen atom denoted $C_{C''}$ ranging from 9 to 18, when said aliphatic polyamide comprises polyamide B';

and a mixture thereof, the weighted average mass of the melting enthalpies of the polyamides A, B', B", C' and C" being higher than 25 J/g (DSC), the average number of carbon atoms per nitrogen atom in polyamides A, B', B", C' and C" further satisfying the following strict inequation: $C_A<C_{B''}$ or $C_{B''}<C_C$ or $C_{C''}$.

16. The tubular structure according to claim 15, wherein
(i) polyamide A is selected from the group of PA 6, PA 46, and PA 66;
polyamide B' is selected from the group of PA 610 and PA 612; and
polyamide C" is selected from the group of PA 11, PA 12, PA 1012, PA 618 and PA 1010; or
(ii) polyamide A is selected from the group of PA 6, PA 46 and PA 66;
polyamide B" is selected from the group of PA 610 and PA 612; and
polyamide C' is selected from the group of PA 1012, PA 618 and PA 1010.

17. The tubular structure according to claim 14, wherein the composition comprises between 34 and 84% by weight of aliphatic polyamide B' or aliphatic polyamide C' relative to the total weight of the polyamides present within said composition.

18. The tubular structure according to claim 1, wherein the additives d. are selected from the group consisting of carbon black, graphite, graphene, carbon fibers, carbon nanotubes, antioxidants, heat stabilizers, UV absorbers, light stabilizers, lubricants, inorganic fillers, fire-proofing agents, nucleating agents, dyes, reinforcing fibers, waxes, and mixtures thereof.

19. The tubular structure according to claim 18, wherein said additives comprise carbon black.

20. The tubular structure according to claim 19, wherein said composition of said layer (1) comprises:
a. between 39% and 95% by weight of the at least one aliphatic polyamide,
b. between 0% and 4% by weight of the plasticizer,
c. between 0% and 20% of the at least one impact modifier,
d. between 5% and 32% by weight of carbon black, and between 0 and 5% by weight of at least one additive other than carbon black, graphite, graphene, carbon fibers and carbon nanotubes,
the sum a.+b.+c.+d. being equal to 100%.

21. The tubular structure according to claim 19, wherein said composition of said layer (1) comprises:
a. between 39% and 85% by weight of the at least one aliphatic polyamide,
b. between 0% and 4% by weight of the plasticizer,
c. between 10% and 18% of the at least one impact modifier,
d. between 5% and 32% by weight of carbon black, and between 0 and 5% by weight of at least one additive other than carbon black, graphite, graphene, carbon fibers and carbon nanotubes,
the sum a.+b.+c.+d. being equal to 100%.

22. The tubular structure according to claim 18, wherein said additives comprise carbon nanotubes.

23. The tubular structure according to claim 22, wherein said composition of said layer (1) comprises:
a. between 70% and 99.5% by weight of the at least one aliphatic polyamide,
b. between 0% and 4% by weight of the plasticizer,
c. between 0% and 20% of the at least one impact modifier,
d. between 0.5% and 10% by weight of carbon nanotubes, and
between 0 and 19% by weight of at least one additive other than carbon black, graphite, graphene, carbon fibers and carbon nanotubes,
the sum a.+b.+c.+d. being equal to 100%.

24. The tubular structure according to claim 22, wherein said composition of said layer (1) comprises:
a. between 70% and 89.5% by weight of the at least one aliphatic polyamide,
b. between 0% and 4% by weight of the plasticizer,
c. between 10% and 18% of the at least one impact modifier,
d. between 0.5% and 10% by weight of carbon nanotubes, and
between 0 and 19% by weight of at least one additive other than carbon black, graphite, graphene, carbon fibers and carbon nanotubes,
the sum a.+b.+c.+d. being equal to 100%.

25. The tubular structure according to claim 1, wherein said structure is devoid of any additive selected from the group of carbon black, graphite, graphene, carbon fibers and carbon nanotubes.

26. The tubular structure according to claim 25, wherein the thickness of said layer (1) is at least 600 µm.

27. A method for transporting fuels into a tank, comprising the step of transporting a fuel through a tubular structure according to claim 1.

* * * * *